United States Patent [19]

Hirano

[11] Patent Number: 4,781,479
[45] Date of Patent: Nov. 1, 1988

[54] TYPEFACE PRODUCT

[75] Inventor: Tadashi Hirano, Tokyo, Japan

[73] Assignee: Data Card Japan Ltd., Tokyo, Japan

[21] Appl. No.: 894,565

[22] Filed: Aug. 8, 1986

[30] Foreign Application Priority Data

Jan. 17, 1986 [JP] Japan .................................. 61-6574

[51] Int. Cl.$^4$ .............................................. B41B 1/02
[52] U.S. Cl. .................................... 400/462; 101/398
[58] Field of Search ............... 101/398, 399, 327, 401, 101/368; 400/462, 463, 174, 661.1, 662

[56] References Cited

U.S. PATENT DOCUMENTS 2,392,521  1/1946  Chollar .............................. 101/327

FOREIGN PATENT DOCUMENTS 20358  2/1982  Japan ................................ 400/174

OTHER PUBLICATIONS

Kosalek et al., "Plated Glass-Filled Nylon Type Wheel"; *IBM Technical Disclosure Bulletin;* vol. 20. No. 3, Aug. 1977; pp. 982-983.

*Primary Examiner*—Clifford D. Crowder
*Attorney, Agent, or Firm*—Lynn L. Augspurger

[57] ABSTRACT

Type capable of being used for both printing and embossing consists of a heat-curable resin and is divided into three layers. The uppermost layer constituting a typeface portion employs a finely divided granular heat-curable resin and exhibits a high hardness and surface smoothness. The lowermost layer constituting an impact face portion employs a coarse granular heat-curable resin and exhibits low hardness and elasticity. An intermediate layer formed by mixing these two layers at the interface between them constitutes a joint portion exhibiting intermediate hardness.

9 Claims, 6 Drawing Sheets

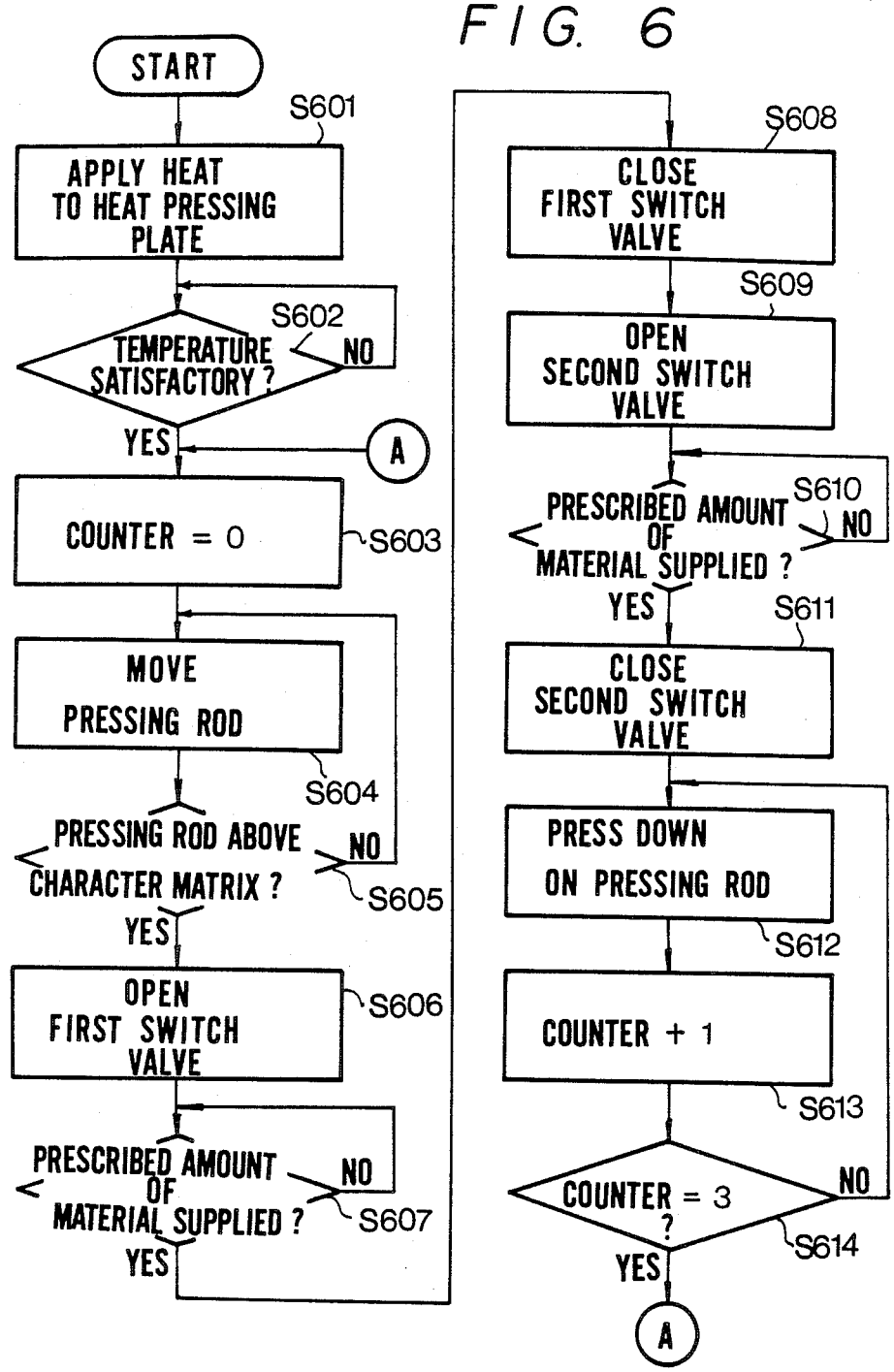

TYPEFACE PRODUCT

BACKGROUND OF THE INVENTION

1. Field of the Invention

This invention relates to type, a method of manufacturing the type, and an apparatus therefor.

2. Description of the Prior Art

To perform printing on a printing medium or to emboss a plastic card or metal name plate, the conventional practice is to use an arrangement in which an item of type is provided on the tip of each vane of a disk-shaped vane wheel and is made of metal. A consequence of such a configuration is great weight and a limitation upon the number of characters. Moreover, the prior art requires engraving of the typeface, surface processing and such tempering as hardening. Though chemical processing such as etching is also employed in the prior art, a disadvantage encountered is the production of a large quantity of industrial waste. The inevitable result is a product of high cost.

Recently developed type for printing is of lighter weight achieved by employing hard resins as the type material. However, printing type of this kind is less durable then type made of metal and therefore necessitates the labor of more frequent replacement. Furthermore, such material involves problems in terms of the quality of the typeface and the strength of the type body when used to fabricate type for embossing, and for this reason the hard resin material cannot be applied to the manufacture of embossing type.

SUMMARY OF THE INVENTION

The present invention is directed to solving the aforementioned problems encountered in the prior art.

Accordingly, an object of the present invention is to provide light-weight, hard type of satisfactory strength and wear resistance which can even be used as type for embossing.

Another object of the present invention is to provide type which can be simply replaced and used even for embossing.

Still another object of the present invention is to provide a type manufacturing method which does not require engraving of typeface, surface treatment, hardening treatment and chemical processing.

Yet another object of the present invention is to provide a a type manufacturing method which does not result in the production of industrial waste.

A further object of the present invention is to provide a type manufacturing apparatus for practicing the manufacturing method of the present invention.

A yet further object of the present invention is to provide a type manufacturing method and apparatus whereby inexpensive type can be produced through mass production.

Type according to the present invention consists of a heat-curable resin and comprises a typeface portion consisting of particles of a first size having a hardness capable of withstanding pressure applied at printing and a particle size affording smoothness, an impact face portion consisting of particles of a second size larger than the first size and having a hardness capable of withstanding pressure applied at printing and an elasticity capable of withstanding and of absorbing impact sustained at printing, and a joint portion located between the typeface portion and the impact face portion and consisting of a mixture of the particles of the first size and the particles of the second size.

In a preferred embodiment of the present invention, the particles of the first size and the particles of the second size constituting the joint portion are mixed while gradually changing the mixing ratio.

In a preferred embodiment of the present invention, the particles of the first size have a mesh of about 75 $\mu$m, and the particles of the second size have a mesh of about 100 $\mu$m.

A method of manufacturing type according to the present invention includes steps of supplying portion which will serve as a typeface with a prescribed amount of a granular heat-curable resin consisting of particles of a first size having a hardness capable of withstanding pressure applied at printing and a particle size affording smoothness after molding, supplying a portion which will serve as an impact face with a prescribed amount of a granular heat-curable resin brought into adhering contact with the granular heat-curable resin of the first size and consisting of particles of a second size larger than the first size and having a hardness capable of withstanding pressure applied at printing and an elasticity after molding capable of withstanding and of absorbing impact sustained at printing after molding, heating the granular heat-curable resins in superimposed form, and applying pressure at least once during heating in cooperation with impact absorbing means for absorbing applied pressure In a preferred embodiment of the present invention, the particles of the first size have a mesh of about 75 $\mu$m, and the particles of the second size have a mesh of about 100 $\mu$m.

A type manufacturing apparatus according to the present invention constitutes a mold having a typeface and comprises first supply means for supplying a portion which will serve as a typeface with a prescribed amount of a granular heat-curable resin consisting of particles of a first size having a hardness capable of withstanding pressure applied at printing and a particle size affording smoothness after molding, second supply means for supplying a portion which will serve as an impact face with a prescribed amount of a granular heat-curable resin brought into adhering contact with the granular heat-curable resin of the first size and consisting of particles of a second size having a hardness capable of withstanding pressure applied at printing and an elasticity after molding capable of withstanding and of absorbing impact sustained at printing after molding, heating means for heating the granular heat-curable resins in superimposed form, pressurizing means for applying pressure to the superimposed granular heat-curable resins during the heating by the heating means, impact absorbing means for absorbing the applied pressure in cooperation with the pressurizing means, and moving means for moving the pressurizing means, first supply means and second supply means relative to the mold.

In a preferred embodiment of the present invention, the particles of the first size have a mesh of about 75 $\mu$m, and the particles of the second size have a mesh of about 100 $\mu$m.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a flowchart illustrating control of an apparatus for manufacturing hard phenol resin type according to an embodiment of the present invention.

DESCRIPTION OF THE PREFERRED EMBODIMENT

According to an embodiment of the present invention the molding compound of heat-curable resin used is xylenol resin, a hard phenol resin, mixed with a filler or reinforcing agent consisting of metallic powder, wood powder, small pieces of paper, small pieces of cloth, asbestos and so on. The molding compound is made by mixing the xylenol resin with hexamethylene-tetramine and above fillers, knedding the mixed material with heat and pressure and grinding the resultant mass of mixed material.

Figure 1:
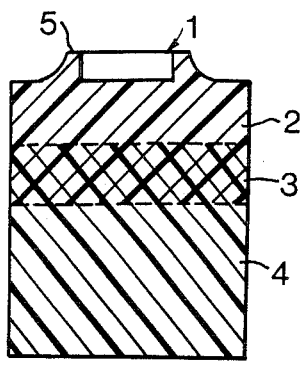
FIG. 1 is a sectional view illustrating an embodiment of hard phenol resin type according to the present invention.

With reference to the sectional view of FIG. 1, there is shown at numeral 1 an item of type consisting of a hard phenol resin according to an embodiment of the present invention. The type 1 is composed of three portions, namely a portion 2 of high hardness, a portion 3 of intermediate hardness, and a portion 4 of low hardness.

The portion 2 of high hardness includes a typeface 5 and the particles of phenol resin have a mesh of about 75 $\mu$m. Owing to this high density, the phenol resin has a hardness of 100° in terms of JIS rubber hardness. A hardness of this degree is sufficient to withstand pressures of 80 to 100 kg/cm$^2$ necessary for embossing work. The high density is for the purpose of achieving a smooth typeface 5 and improving character precision.

The low-hardness portion 4 on the side of type 1 opposite the typeface 5 consists of phenol resin particles having a mesh of about 100 $\mu$m. This is coarser than the high-hardness portion 2, with the hardness here being 90° in terms of JIS rubber hardness. A hardness of this degree is sufficient to withstand pressures of 80 to 100 kg/cm$^2$ necessary for embossing work. The elasticity of this portion is capable of absorbing impact sustained when a pressing force is applied to the back surface during embossing and thus assures that the type will suffer little damage from impact.

The portion 3 of intermediate hardness is formed between the high-hardness portion 2 and low-hardness portion 4 when the materials constituting these two portions are mixed while gradually changing the mixing ratio during manufacture, as will be described in detail below. The average hardness of portion 3 is 95° in terms of JIS rubber hardness. The intermediate-hardness portion 3 prevents impact-induced exfoliation of the joined high- and low-hardness portions 2, 4, the properties whereof differ slightly from each other.

Figure 2:
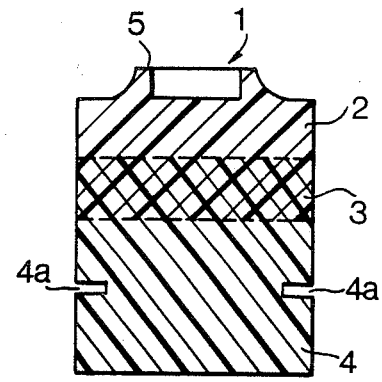
FIG. 2(a) is a sectional view illustrating an embodiment of hard phenol resin type capable of being attached to a disk-shaped vane wheel in accordance with the present invention.
FIG. 2(b) is a view showing hard phenol resin type attached to the vane of a disk-shaped vane wheel according to an embodiment of the present invention.
Figure 2:
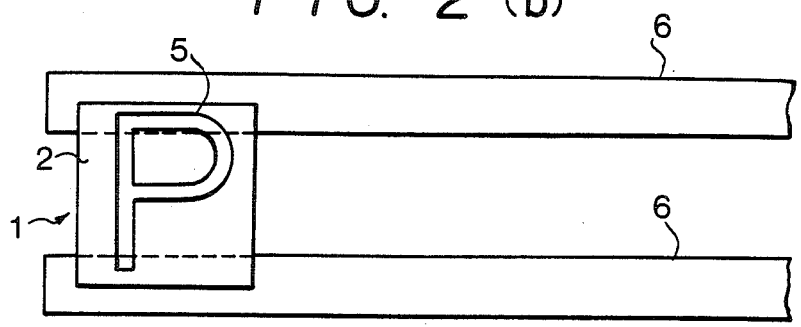

FIG. 2(a) illustrates the hard phenol resin type 1 in a form which enables it to be attached to the edge of a disk-shaped vane wheel. Specifically, the portion 4 of low hardness is provided in two opposing sides with grooves 4a so that the type 1 can be used by being attached between the tips of vanes 6 of a vane wheel, as depicted in FIG. 2(b). The aforementioned hardness and elasticity of the low-hardness portion 4 prevent impact-induced damage of the grooves 4a when embossing is performed and serve to enhance the adhesion between the grooves 4a and the vanes 6 of the vane wheel.

It will be appreciated that the type 1 is capable of being freely attached to and detached from the vane 6. This enables the type 1 to be easily replaced in the unlikely event that it should be damaged by impact, thus permitting the vane wheel 6 to be put back into use quickly merely by replacing the damaged type. It is also possible to arranged the type in a different order to accommodate the particular embossing apparatus, and type that are used with great frequency can be provided in a plurality of sets. If the embossing apparatus is programmable, various methods of utilization become possible.

Figure 3:
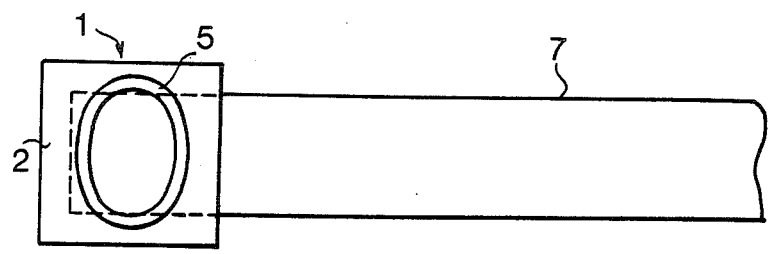
FIG. 3 is a view illustrating hard phenol resin type equipped with a vane according to an embodiment of the present invention.

FIG. 3 illustrates the hard phenol resin type 1 equipped with a vane 7. If the vane 7 is embedded in the portion 4 of low hardness at the time of manufacture, looseness that might otherwise be caused by positional displacement between the vane 7 and the type 1 at the time of embossing will not occur. If the type happens to be damaged during use, the type can be replaced along with the affixed vane 7. Though the vane 7 can be made of metal, adhesion between the vane and type 1 will be greatly enhanced if the vane 7 is made of a highly elastic phenol resin and is manufactured at the same time as the type 1.

Figure 4:
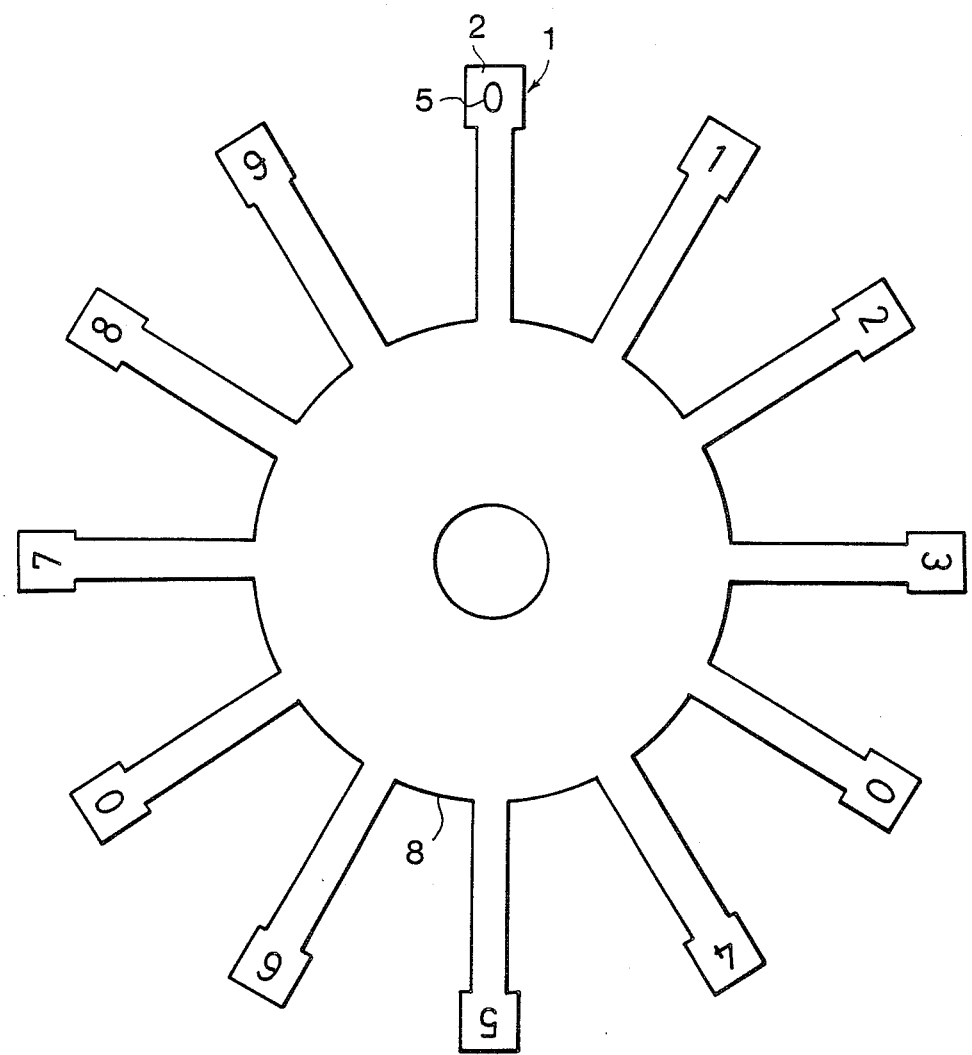
FIG. 4 is a plan view showing a disk-shaped vane wheel equipped with hard phenol resin type according to an embodiment of the present invention.

FIG. 4 is a plan view illustrating a vane wheel 8 of the kind provided with the type 1 in accordance with the present invention. The illustrated vane wheel 8 is manufactured together with the type 1 at the same time. Though damage to any of the type 1 will necessitate replacing the entire wheel 8, the wheel 8 and attached type 1 can be manufactured at very low cost.

Figure 7:
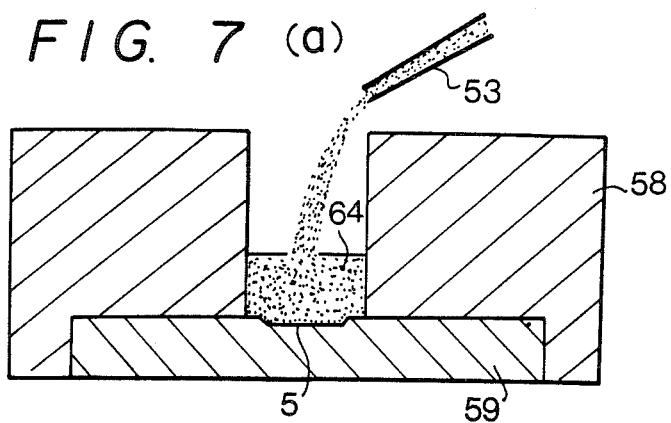
FIGS. 7(a), (b), (c) are sectional views illustrating the principle of a method of manufacturing hard phenol resin type.
Figure 7:
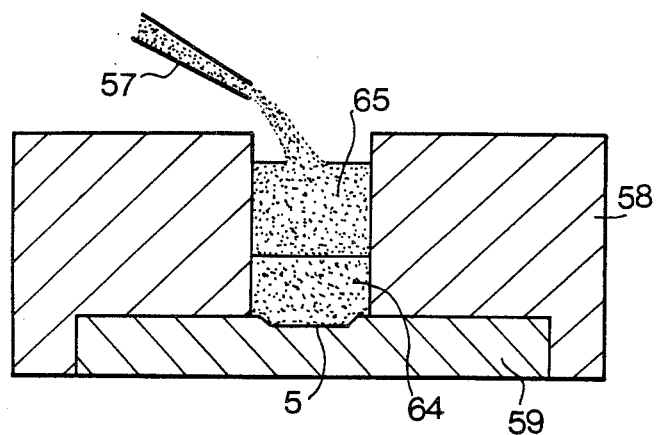
Figure 7:
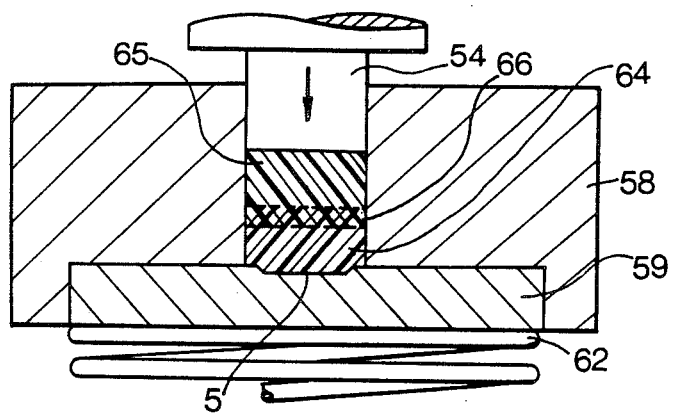

FIGS. 7(a), (b) and (c) illustrate the principle of the method of manufacturing a hard phenol resin type according to the present invention.

The first step of the process, illustrated in FIG. 7(a), is to pour finely divided granular phenol resin 64 into a character matrix 59 from a nozzle 53. Here the granular resin has a mesh size of about 75 $\mu$m. The second step, depicted in FIG. 7(b), is to pour a coarse granular phenol resin 65 onto the finely divided granular phenol resin 64 from a nozzle 57. The granular resin has a mesh size of about 100 $\mu$m in the present embodiment. As shown in FIG. 7(c), the third step entails applying pressure to the granular phenol resins 64, 65 by a pressing rod 54 and heating these resins by heat generated in a mold main body 58 and in the character matrix 59, whereby the granular resins are molded into the hard phenol resin type 1. A preferred molding pressure is about 1000 kg/cm$^2$ and a preferred molding temperature is from 160° C. to 180° C. During the molding process, the pressing rod 54 applies pressure to the granular phenol resins 64, 65 a plurality of times (three in the illustrated embodiment). This repeated application of pressure in cooperation with impact absorbing means such as springs 62 causes the granular phenol resins 64, 65 to vibrate, thereby mixing the finely divided granular resin 64 and the coarse granular resin 65 at a continuously and gradually changing mixing ratio at the interface between them. This produces an intermediate layer 66, which corresponds to the portion 3 of intermediate hardness. The layers of granular phenol resins 64, 65 correspond to the portions 2, 4 of high and low hardness, respectively.

Figure 5:
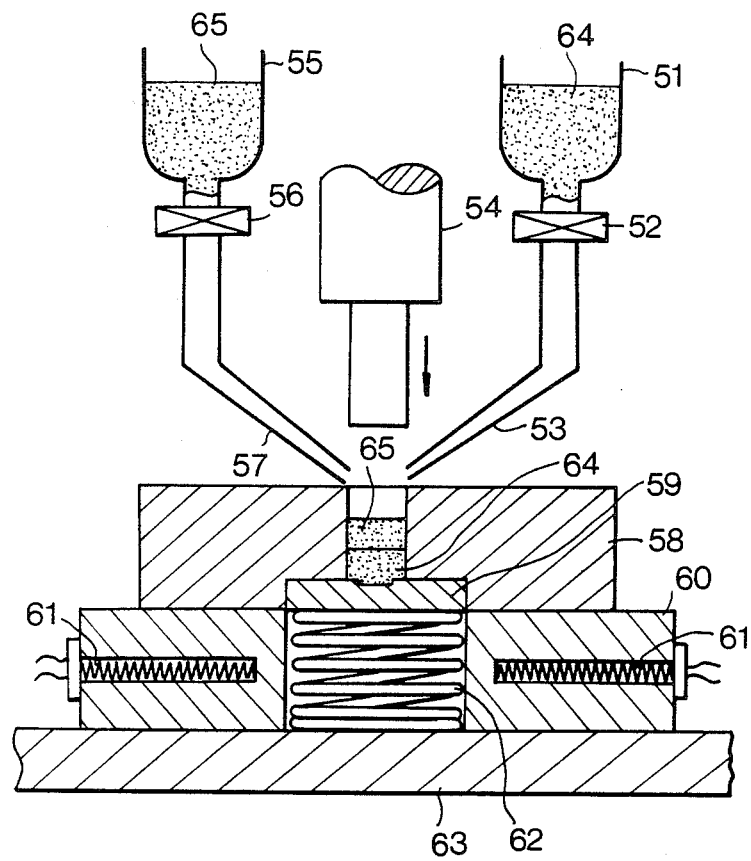
FIG. 5(a) is a schematic view illustrating the manufacturing section of an apparatus for manufacturing hard phenol resin type according to an embodiment f the present invention.
FIG. 5(b) is a block diagram illustrating the control section of an apparatus for manufacturing hard phenol resin type according to an embodiment of the present invention.
Figure 5B:
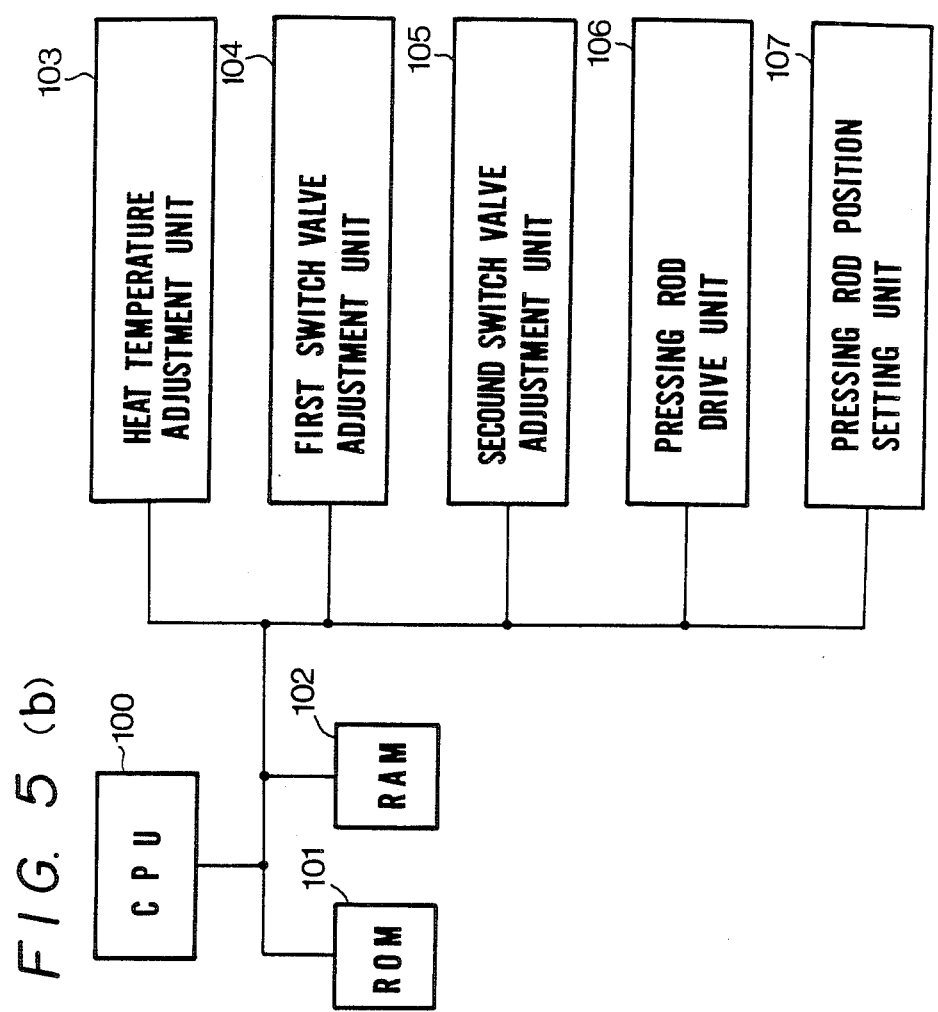

FIGS. 5(a), (b) are views illustrating a hard phenol resin type manufacturing apparatus for practicing the abovedescribed method of the present invention. FIG. 5(a) shows the manufacturing section proper, and FIG. 5(b) depicts the control section. The control section of FIG. 5(b) includes a ROM 101 storing a program the flowchart of which is shown in FIG. 6, and a CPU 100 for controlling the manufacturing section of FIG. 5(a) in accordance with the program. Let us now describe the operation of the apparatus in conjuction wit the flowchart of FIG. 6.

When the apparatus is started, a heating press plate 60 is heated at a step S601 by a heater 61 regulated by a heat temperature adjustment unit 103. The CPU 100 then checks at a step S602 whether the temperature has reached a prescribed temperature of about 120° C. (A preferred temperature is from 90° C. to 120° C.) If the prescribed temperature is attained, a step S603 calls for the CPU 100 to set a counter in a RAM 102 to zero. This is followed by a step S604, at which the CPU 100 causes the pressing rod 54 to be rotatively advanced by a pressing rod position setting unit 107. The CPU then checks at a step S605 whether the pressing rod 54 has reached a position immediately above the character matrix 59. If the decision rendered at the step S605 is YES, the CPU 100 halts the rotative advance of the pressing rod 54 and causes a first switch valve adjustment unit 104 to open a first switch valve 52 at a step S606, whereby the finely divided granular phenol resin 64 is delivered from a hopper 51 and poured onto the character matrix 59 of the mold main body 58 through the nozzle 53.

The next step S607 calls for the CPU 100 to check as to whether a prescribed amount of the finely divided granular phenol resin has been poured. If the answer at this step is affirmative, the CPU 100 causes the first switch valve adjustment unit 104 to close the first switch valve at a step S608. Next, at a step S609, the CPU 100 causes a second switch valve adjustment unit 105 to open a second switch valve 56, whereby the coarse granular phenol resin 65 in a hopper 55 is poured onto the finely divide granular phenol resin 64 in the mold main body 58 through the nozzle 57. The next step S610 calls for the CPU 100 to check as to whether a prescribed amount of the coarse granular phenol resin 65 has been poured. If the answer at this step is affirmative, the CPU 100 causes the second switch valve adjustment unit 104 to close the second switch valve at a step S611. The granular resins 64, 64 introduced into the mold are melted by the heat (A preferred temperature is from 160° C. to 180° C.) transmitted to the mold body 58 and character matrix 59 from the heating press plate 60. Thereafter, as the granular resins 64, 65 attempt to solidify, the CPU 100 at steps S612, S613, S614 causes a drive unit 106 to lower the pressing rod 54 three times to mold the granular resins 64, 65. (A preferred pressure is about 1000 kg/cm$^2$) At this time the springs 62 buffer the pressure applied by the pressing rod 54 so that the granular phenol resins 64, 65 are allowed to vibrate and form the intermediate layer of mixed fine and coarse granular resins. At the completion of molding, the program returns from step S614 to step S603. The pressing rod 54 is then moved into position above the next character matrix in the array through steps S604, S605 and the foregoing operations are repeated to manufacture the hard phenol resin type constituting the next character.

In the illustrated embodiment, the pressing rod 54 is rotatively advanced. However, an arrangement is possible wherein the pressing rod 54 is held stationary and the mold is rotated. It is also possible to adopt an apparatus for substituting molds, though this will complicate control. Further, in the illustrated embodiment, the finely divided granular phenol resin 64 is introduced into the bottom of the mold, the coarse granular phenol resin 65 is poured onto the granular resin 64, and the granular resins 64, 65 are molded by the pressing rod 54 which applies pressure from above. An alternative approach would be employ a pressing 0 rod having a heater, dispose the character matrix at the distal end of the pressing rod, introduce the coarse granular phenol resin into the bottom of the mold, pour the finely divided granular phenol resin onto the coarse granular resin and then perform molding. Though phenol resin is the material used in the illustrated embodiment, it is permissible to use other heat-curable resins or other materials having a similar property.

The principle illustrated in the type manufacturing method of the present invention can be widely applied as a technique for laminating and molding materials having different properties.

As many apparently widely different embodiments of the present invention can be made without departing from the spirit and scope thereof, it is to be understood that the invention is not limited to the specific embodiments thereof except as defined in the appended claims.

What is claimed is:

1. Type consisting of a heat-curable resin and comprising:

a typeface portion consisting of particles of a first size having a hardness capable of withstanding pressure applied at printing and a particle size affording smoothness;

an impact face portion consisting of particles of a second size larger than the first size and having a hardness capable of withstanding pressure applied at printing and an elasticity capable of withstanding and of absorbing impact sustained at printing; and a joint portion located between said typeface portion and said impact face portion and consisting of a mixture of the particles of the first size and the particles of the second size.

2. Type according to claim 1, wherein the particles of the first size and the particles of the second size constituting said joint portion are mixed at a gradually changing mixing ratio.

3. Type according to claim 1, wherein the particles of the first size have a mesh of about 75 μm, and the particles of the second size have a mesh of about 100 μm.

4. Type consisting of a heat-curable resin and comprising:
   a typeface portion consisting of particles of a first size having a hardness capable of withstanding pressure applied at embossing and a particle size affording smoothness;
   an impact face portion consisting of particles of a size larger than the first size and having a hardness of withstanding pressure applied at embossing and an elasticity capable of withstanding and of absorbing impact sustained at embossing; and
   a joint portion located between said typeface portion and said impact face portion and consisting of a mixture of the particles of the first size and the particles of the second size.

5. Type according to claim 4, wherein the particles of the first size and the particles of the second size constituting said joint portion are mixed at a gradually changing mixing ratio.

6. Type according to claim 4, wherein the particles of the first size have a mesh of about 75 μm, and the particles of the second size have a mesh of about 100 μm.

7. Type according to claim 4, wherein said impact face portion has a groove for attaching said impact face portion to vane wheel.

8. Type according to claim 4, wherein said impact face portion has a vane projecting from the proximity of a central portion thereof.

9. Type according to claim 8, wherein a plurality of said vanes are connected at distal end portions thereof to form a disk-shaped vane wheel.

* * * * *